United States Patent [19]

Decoene

[11] 4,236,369

[45] Dec. 2, 1980

[54] ROW CROP ATTACHMENT

[75] Inventor: Frans J. G. C. Decoene, Zedelgem, Belgium

[73] Assignee: Sperry Corporation, New Holland, Pa.

[21] Appl. No.: 956,717

[22] Filed: Nov. 1, 1978

[30] Foreign Application Priority Data

Nov. 9, 1977 [GB] United Kingdom ............... 46542/77

[51] Int. Cl.³ .............................................. A01D 45/02
[52] U.S. Cl. ......................................... 56/60; 56/13.9; 56/14.5; 56/98
[58] Field of Search .............................. 56/14.3–14.6, 56/13.9, 60, 94, 98, 103, 106, 109

[56] References Cited

U.S. PATENT DOCUMENTS

| 3,439,479 | 4/1969 | Zitko et al. .............................. 56/94 |
| 3,818,685 | 6/1974 | Stoessel et al. .......................... 56/98 |
| 3,930,354 | 1/1976 | Borderie ................................. 56/94 |

FOREIGN PATENT DOCUMENTS

| 318278 | 10/1974 | Austria ....................................... 56/13.9 |
| 2457452 | 9/1975 | Fed. Rep. of Germany ............ 56/119 |
| 2369785 | 6/1978 | France ......................................... 56/94 |
| 1356698 | 6/1974 | United Kingdom ..................... 56/13.8 |

Primary Examiner—Robert A. Hafer
Attorney, Agent, or Firm—James R. Bell; Frank A. Seemar

[57] ABSTRACT

The invention provides a low profile, compact row crop attachment which eliminates the use of crop conveyors in the form of chains with crop-engaging extensions attached thereto, such conveyors being subject to fast wear and being relatively expensive to replace. The chain type conveyors are replaced by a plurality of rotary means which are staggered transversely of the attachment relative to each other and positioned along side and outside an associated stalkway defined by a pair of spaced apart members. Conveyor means extend from the rotary means from outside into the associated stalkway so as, in operation, to convey crop along that stalkway.

24 Claims, 12 Drawing Figures

ROW CROP ATTACHMENT

BACKGROUND OF THE INVENTION

1. Field of the Invention

This invention relates to row crop attachments for harvesting machines. The invention will be discussed in relation to forage harvesters but is not restricted thereto.

In the preparation of forage from "stalk" crops, such as corn and sorghum, the entire stalk, including the grain, is cut and fed to a chopping or cutter unit for chopping into small feed pieces. Forage harvesters for preparing forage in this way normally comprise a base unit having a chopping mechanism and a crop gathering unit which cuts the crop and conveys it to the chopping mechanism. The chopped or cut crop is blown, or otherwise conveyed, into a trailing wagon or the like in which it is transported to a silo or other storage facility.

2. Description of the Prior Art

Crop gathering attachments have been developed to cut one, two, three, or four rows of crops at one time. These gathering means comprise a mechanism for severing the stalks and delivering them, butt ends first, between opposed feed elements. Such gathering means also comprise a pair of laterally opposed gathering frames for each row of crop, the frames defining between them a stalk-receiving passage in advance of, and aligned with, the feed elements. Angularly disposed flights of gathering chains are usually provided along the gathering frames to insure that the stalks move rearwardly into the forage harvester and to hold the stalks in the required orientation until they are acted upon by the feed elements. The gathering frames customarily are provided with rearwardly and upwardly inclined fenders or surfaces over which the stalks may ride and be supported during their movement through the gathering means.

In the past a large number of moving parts have been incorporated in the crop gathering means. Usually two or more pairs of superposed gathering chains, and associated drive means, have been employed per row of crop handled by the harvester. Such a large number of moving parts not only requires a great amount of motive power but also increases the cost of manufacture, maintenance and operation. Also, the gathering chains, which are quite expensive, are fast-wearing components and it is not exceptional to have to replace all gathering chains at the end of every season and even replacement during the course of a season is sometimes necessary. Chain replacement is a time-consuming, cumbersome and expensive exercise. In addition, the large number of moving parts and their supporting structure result in a relatively heavy crop gathering attachment which is particularly undesirable in certain machines. For example, in some forage harvesters the crop gathering attachment used to harvest corn may be interchanged with other attachments, such as those used for picking up hay in windows or direct cutter units for grass. A heavy or bulky gathering unit increases the difficulty of attachment and detachment, and also of supporting and adjusting the gathering unit relative to the base unit. As the gathering attachments are attached to the forward end of the base unit, heavy attachments may result in an undesirable positioning of the center of gravity relative to the wheel base of the machine.

Despite the large number of crop-engaging components normally employed, some of the severed crop escapes the action of the conveying means and either becomes entangled in the various components and plugs the machine or falls to the ground and is a loss to the harvesting operation.

Other crop gathering attachments have only one pair of gathering chains per crop row. The height of such attachments is substantially smaller than the height of those described above and, therefore, these attachments are often identified as "low profile" attachments. The drive means in a "low profile" attachment are less complicated and comprise fewer components, whereby the cost thereof is also reduced accordingly. Unfortunately, such low profile attachments need to be moved much more accurately along the rows of crop, otherwise stalks frequently are missed by the gathering chains and thus lost. This requires the sustained attention of the operator which is tiring and can slow down the operation of the harvester. This problem is accentuated when harvesting corn which has been wholly or partially flattened by storms, or when harvesting tall crop. Also, severed stalks occasionally escape the grasp of the gathering chains and are lost. Furthermore, the low profile gathering attachments still have the expensive and fast-wearing gathering chains.

Gathering attachments without gathering chains are also known. Some of these attachments have a pair of opposed upright gathering rolls positioned forwardly of the conventional transverse feed rolls and at the rear ends of the crop gathering frames. Others have two pairs of opposed, vertical gathering rolls. The forwardmost gathering rolls have a pair of rotary cutting blades adjacent their lower ends for severing the stalks from the ground during operation, and both pairs of rolls operate to convey cut crop rearwardly of the forage harvester either to transverse pre-compression feed rolls or to the chopping unit disposed immediately rearwardly thereof. This type of gathering attachment has a limited harvesting capacity. Moreover, crop feeding problems frequently occur with such arrangements and therefore, this type of forage harvester attachment has, to date, not been acceptable.

SUMMARY OF THE INVENTION

The object of the present invention is to overcome or to attenuate one or more of the foregoing disadvantages of known row crop attachments.

According to the present invention a row crop attachment for a harvesting machine comprises first and second guide members each having guide surfaces forming a stalkway having a rear discharge opening. A plurality of conveyor elements rotate for moving stalks along the length of the stalkway. The conveyor elements are staggered so as to provide a stalkway of generally serpentine configuration. As a result, the stalkway includes concave portions and the conveyor elements are adjacent the concave portions at least one pair of spaced apart members defining an elongated stalkway therebetween, a plurality of rotary means which are staggered transversely of the attachment relative to each other and positioned alongside and outside the associated stalkway, and conveyor means mounted on the rotary means and extending from outside into the associated stalkway so as, in operation, to convey crop along that stalkway.

The rotary means may also be staggered longitudinally of the attachment, relative to each other.

By transverse staggering of the various rotary means is meant that the rotary means do not lie on one and the same transverse axis of the attachment. Similarly, by longitudinal staggering is meant that the rotary means do not lie on one and the same longitudinal axis of the attachment.

Each pair of spaced members may be in the form of elongated gathering frames defining between them a generally vertical stalkway and having forward extensions to provide crop dividers, the dividers tapering from the rear to the front on all sides. The gathering frames may be provided with fenders or surfaces made of sheet metal with the fenders defining the stalkway having elongated, fore-and-aft apertures for the passage therethrough of the associated conveyor means. Apart from the foregoing apertures, the facing sides of the gathering frames defining the stalkways are shielded to the greatest possible extent.

The rotary means may be either generally upright shafts or drums arranged to support the crop conveyor means. The stalkways may be non-linear and may be of serpentile form in which case, the rotary means preferably are located on the concave side of the peaks or troughs of the stalkways so as to increase the effective path lengths of the conveyor means. The forwardmost rotary means at each side of each stalkway may support adjacent their bottom ends rotary cutter blades. Preferably, the paths of the pair of cutter blades in each stalkway overlap each other at a location within the stalkway and operate to sever crop stalks from the ground.

The conveyor means preferably are in the form of rods, fingers or blades having curved outer ends and/or mounted on the rotary means such that the outer ends trail or lag with respect to the direction of rotation so that they easily release the stalks at a release point in the associated stalkway after having conveyed them over a certain distance along the stalkway. The rods, fingers or blades preferably are provided in one or more planes or sets and extend through the elongated apertures in the sides of the gathering frames into the stalkways. Preferably the crop conveyor means of opposed pairs of rotary means overlap each other within the associated stalkway. Therefore, the cooperating sets of conveyor means are either slightly staggered in height or the drives thereof are synchronized so that the conveyor means can mesh with one another without physical interference. The conveyor means may have the same or different lengths; in the latter case, the rotary means have a reduced overall diameter which help in the convergence of the attachment towards the chopping unit of the forage harvester, particularly when a plurality of stalkways are employed.

When the row crop attachment comprises three or more stalkways, it may be desirable to provide crop spreading means at the discharge ends of the stalkways. The crop spreading means may be in the form of a pair of horizontal rolls having crop deflector means thereon for spreading the crop over the discharge area of the attachment.

Rotary crop deflector means may be mounted on the forward ends of the stationary means at a location forwardly of the cutter means for deflecting uncut crop into the stalkways, which crop might otherwise not enter the same. These rotary crop deflector means may be similar in construction to the crop conveyor means mentioned above but preferably are spaced further apart.

BRIEF DESCRIPTION OF THE DRAWINGS

Row crop attachments for a forage harvester in accordance with the present invention will now be described in greater detail, by way of example, with reference to the accompanying drawings, in which.

DETAILED DESCRIPTION OF THE PREFERRED EMBODIMENT

The terms "forward", "rearward", "right-hand side" and "left-hand side" used throughout the specification are with respect to the direction of movement of the machine in operation.

Figure 1:
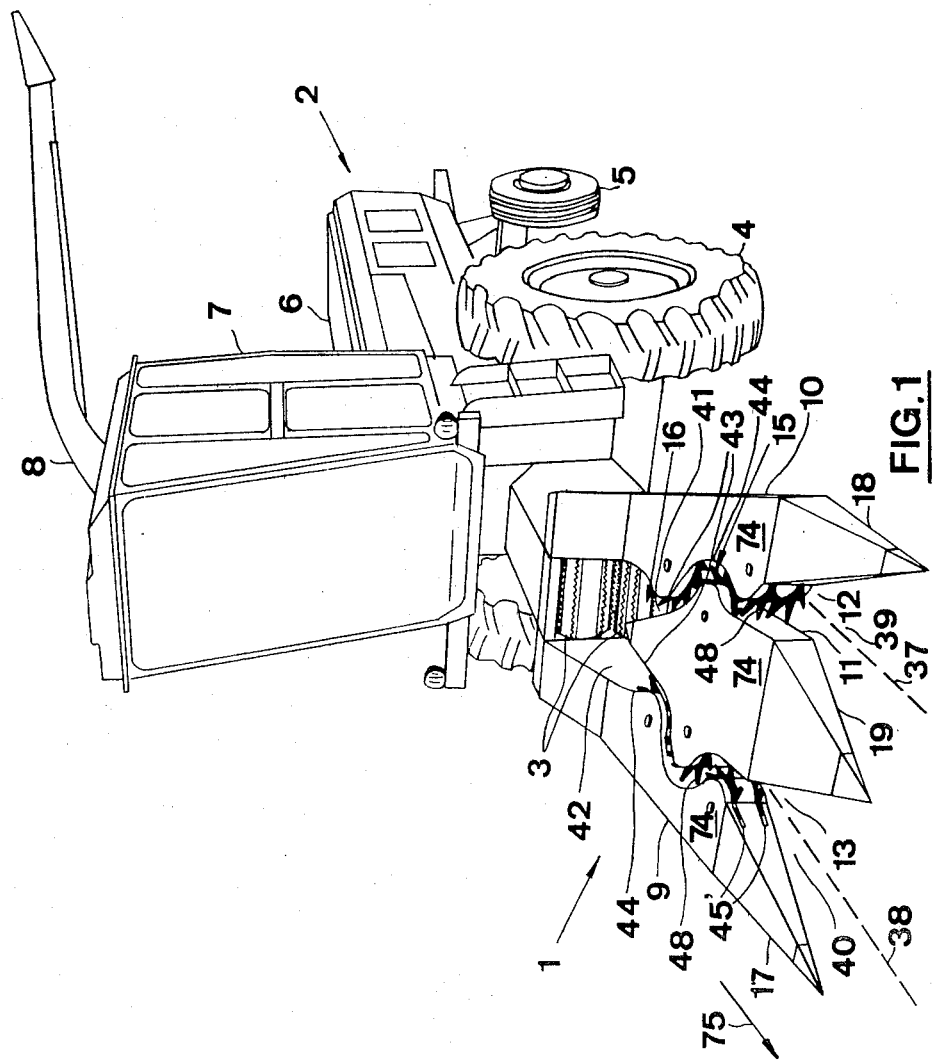
FIG. 1 is a perspective view of one row crop attachment mounted on a self-propelled base unit of a forage harvester.

Referring to FIG. 1 there is shown a self-proeplled forage harvester comprising a row crop attachment or crop gathering unit 1 (constructed in accordance with the present invention) mounted on a base unit 2. The base unit 2 comprises the usual feed rolls 3 and a chopping mechanism or cutter head (not shown), the base unit being supported on a pair of traction wheels 4 and a pair of steerable wheels 5. The base unit 2 further comprises an engine compartment 6 with a power source therein and an operator's cab 7 housing the operator's seat, steering wheel and various controls. The chopping mechanism or cutting head and the feed rolls 3 of the base unit 2 are driven in a conventional manner through gears and pulleys, receiving their power from the power source incorporated in the machine. Chopped material is discharged through a spout 8 into a trailer or the like (not shown).

Figure 2:
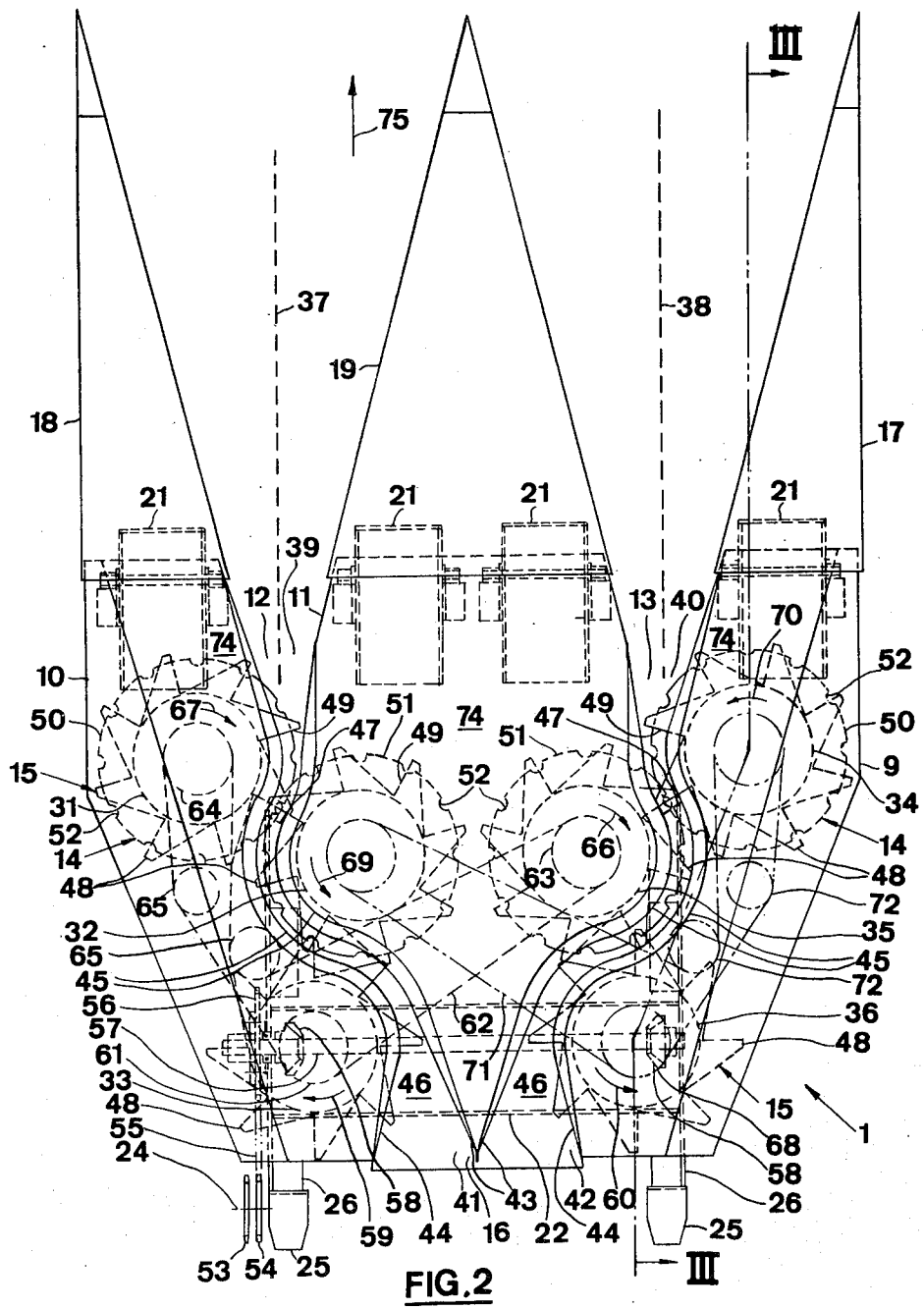
FIG. 2 is a top view to a larger scale, of the row crop attachment of FIG. 1.
Figure 3:
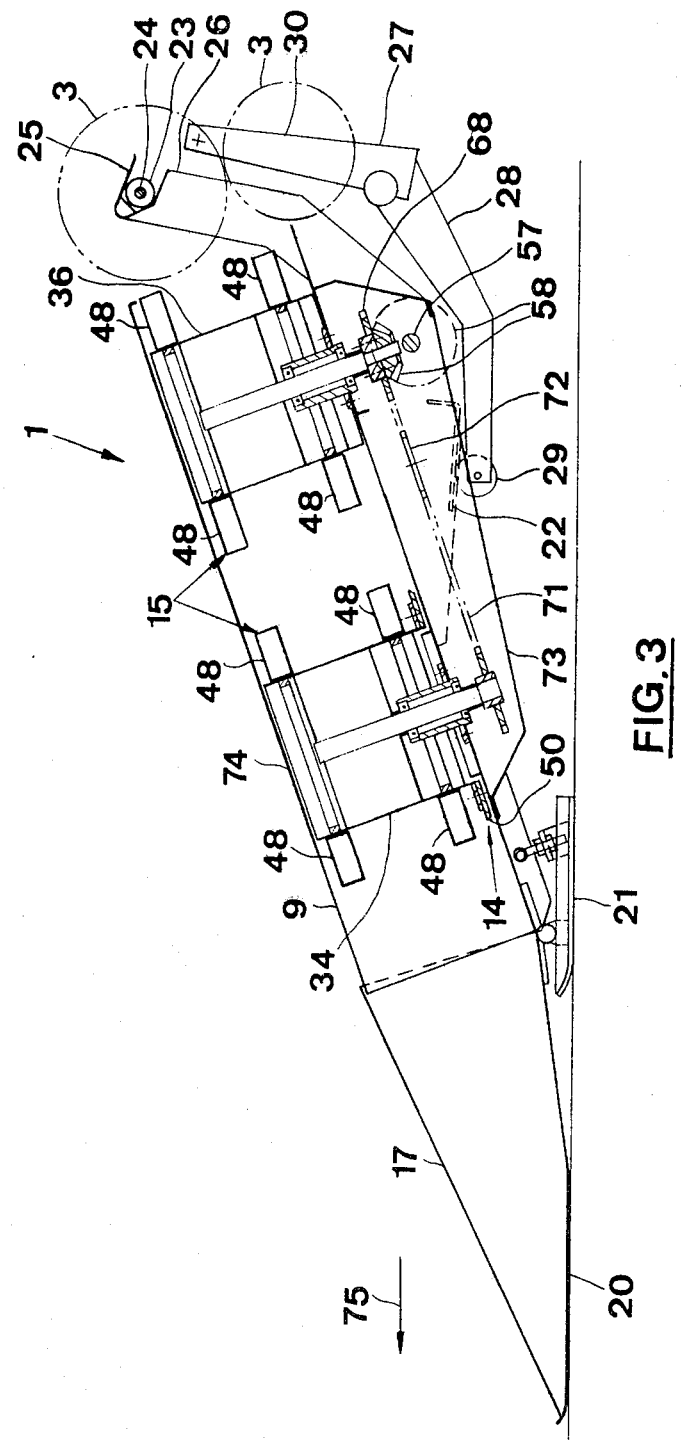
FIG. 3 is a section on the line III—III of FIG. 2.
Figure 4:
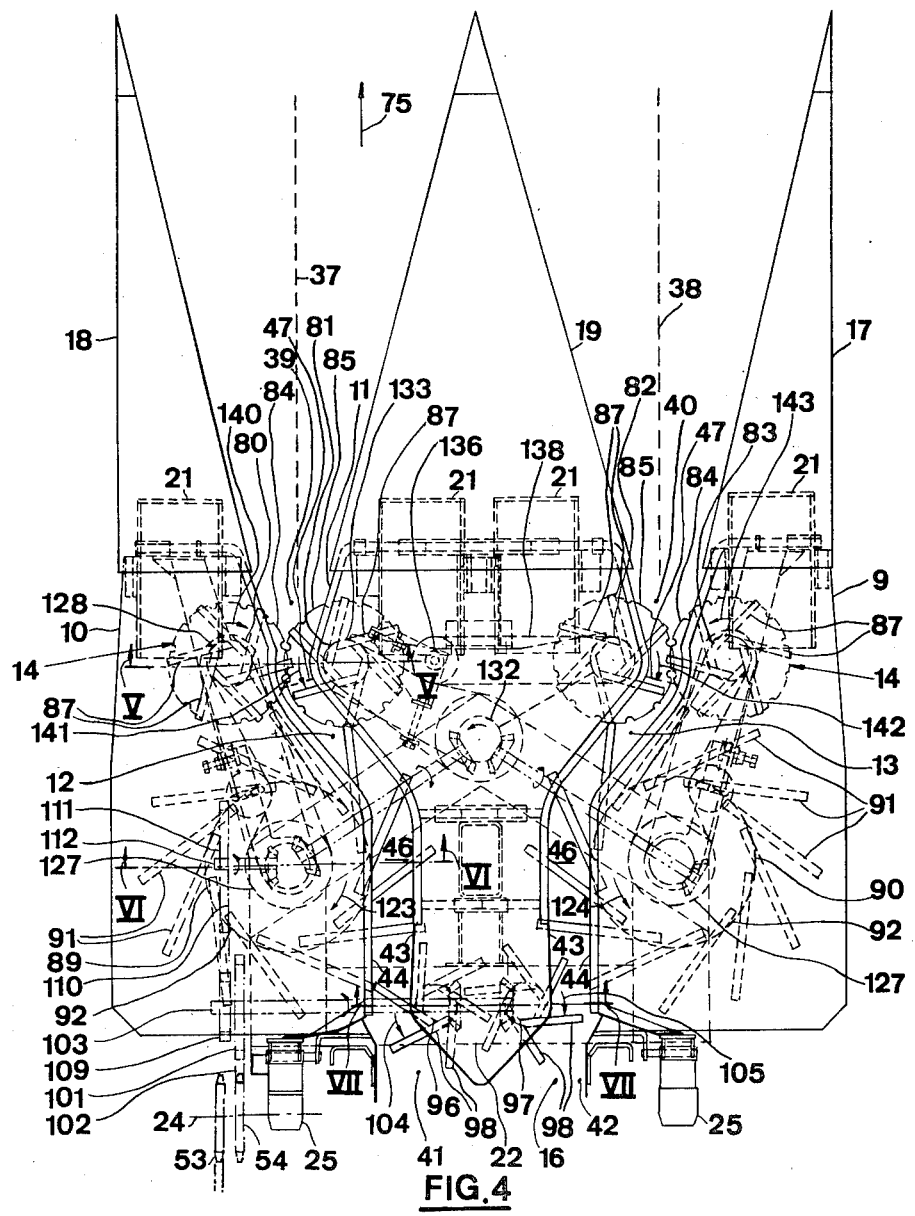
FIG. 4 is a view similar to FIG. 2 but showing an alternative embodiment.
Figure 5:
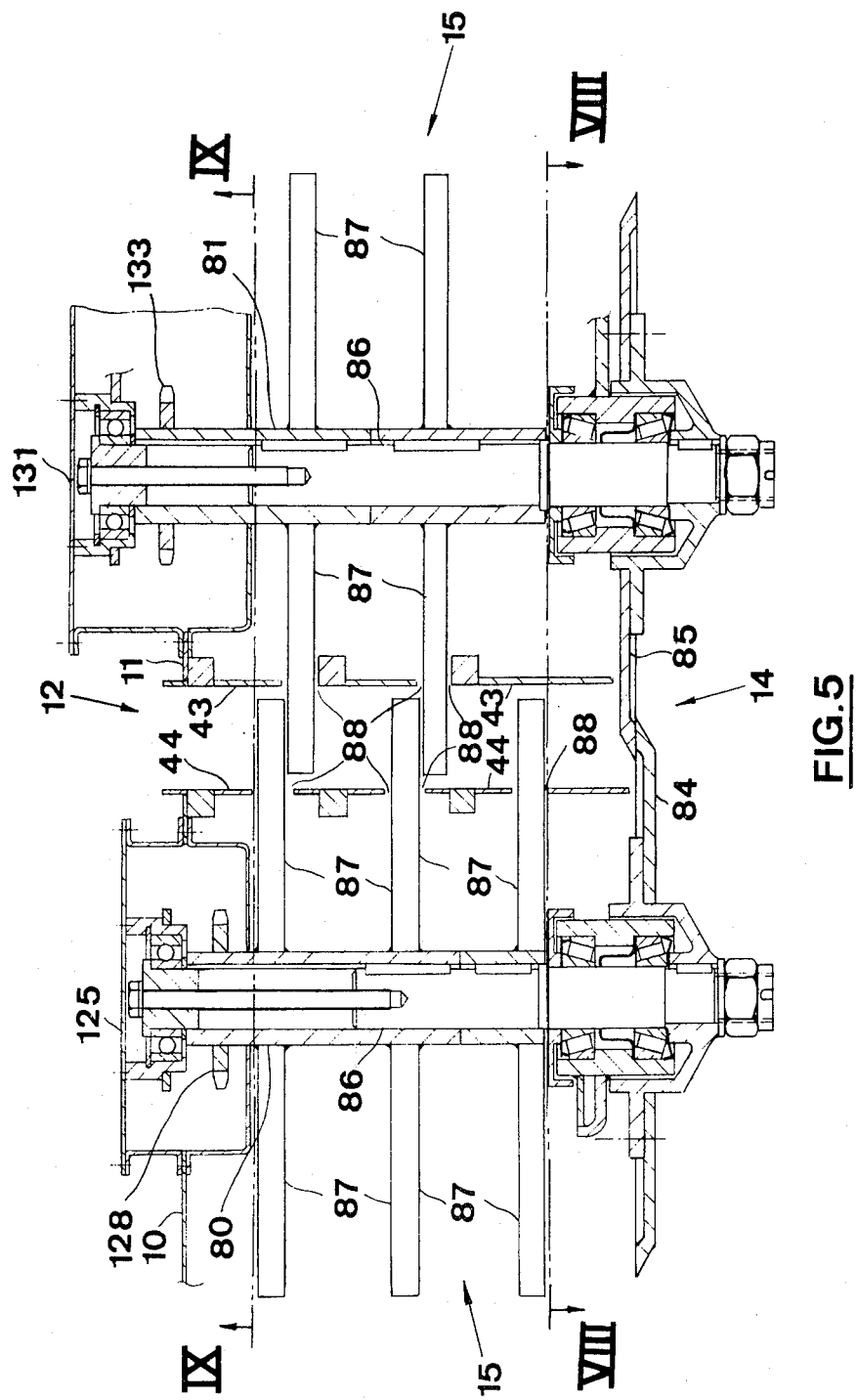
FIGS. 5, 6 and 7 are respective sections on lines V—V, VI—VI, and VII—VII of FIG. 4.
Figure 6:
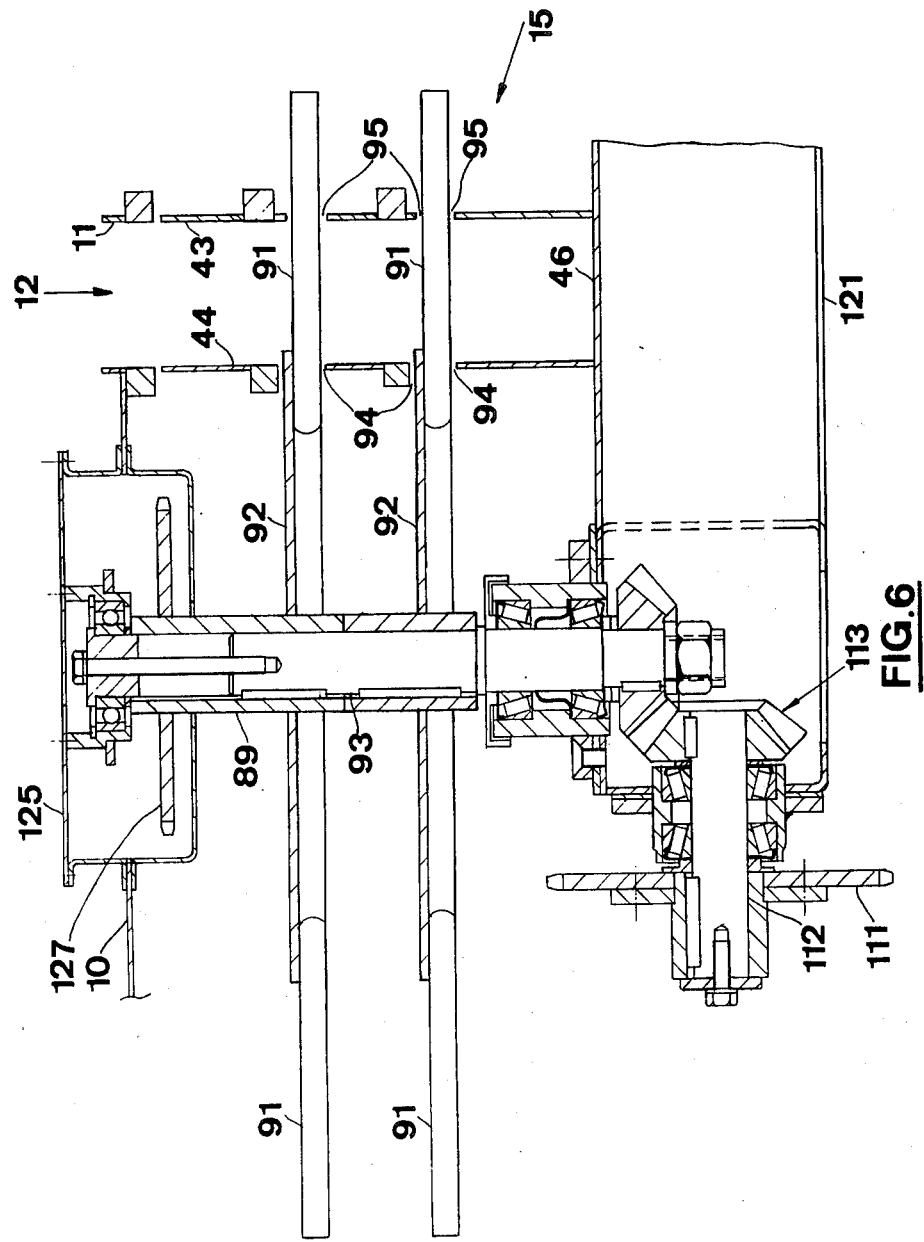
Figure 7:
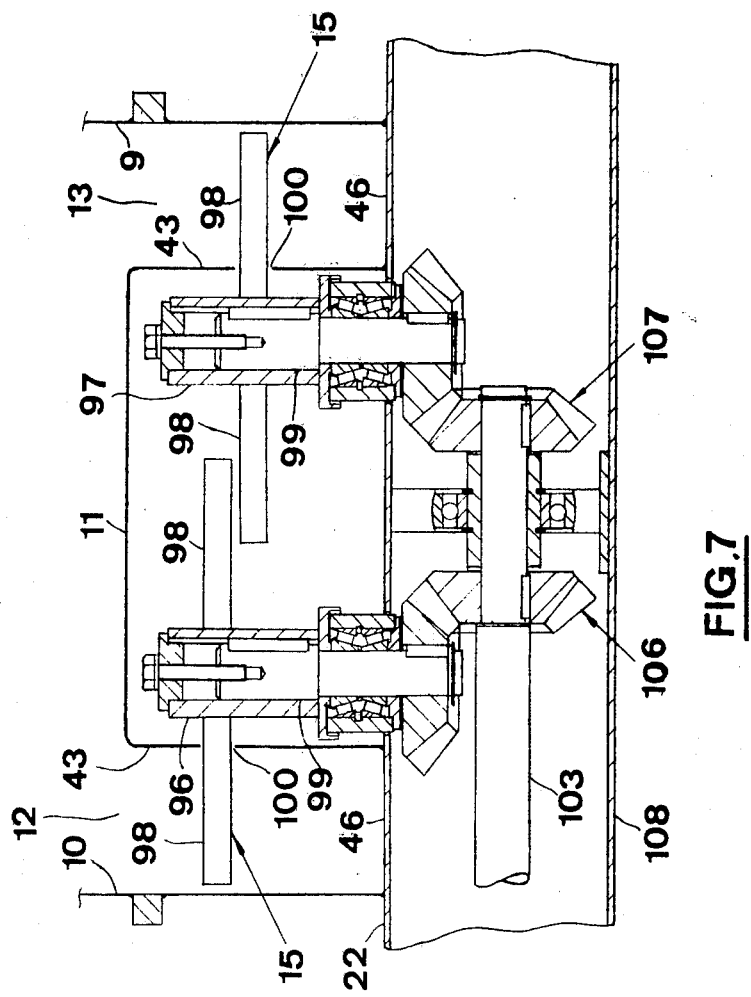

Turning now to FIGS. 2 and 3, the first embodiment of the invention will be described in greater detail. The row crop attachment 1 comprises a pair of outer longitudinally-extending crop gathering frames 9 and 10 and a central guide frame 11 laterally spaced from each other to form between the respective outer frames 9 and 10 and the central guide frame 11 two crop stalkways or passages 12 and 13. The attachment 1 further comprises cutter means 14 for severing crop stalks received in the stalkways 12 and 13, and crop conveyor means generally indicated at 15 for engaging the stalks and moving them upwardly and rearwardly in the stalkways 12 and 13 for delivery to the base unit 2.

The crop gathering frames 9,10 and 11 are formed of sheet metal and are so laterally spaced apart as to pass at opposite sides of two rows of crop. The frames 9, 10 and 11 are joined together at the lower portions of their rearward ends and form a throat 16 having a width substantially equal to that of the cutter head in the base unit 2. The sides of the central guide frame 11 taper towards each other in a rearward direction terminate at the discharge end of the attachment 1. The inwardly facing sides of the frames 9 and 10 diverge in the rearward direction to define, at their discharge end, the throat 16. When seen in the operative position, the frames 9, 10 and 11 slope downwardly and forwardly to points near the ground and their forward ends are provided with respective sheet metal nose members 17, 18 and 19 which have oppositely facing walls diverging forwardly to form stalkway entrances which are wider than the stalkways 12,13 themselves. The forward ends of the nose members 17, 18 and 19 are provided with shoes 20 which protect the sheet metal portions and absorb any wearing action which might occur as a result of engagement with the ground. Ground-engaging skids 21 are arranged underneath the frames 9, 10 and 11 to support a portion of the weight of the row crop attachment on the ground and for following the ground contours. The angular position of the skids 21 may be made adjustable.

The entire sheet metal structure forming the frames 9, 10 and 11, the throat 16 and the nose members 17, 18 and 19 is mounted on a frame 22 to form a unitary structure adapted to be detachably mounted on the base unit 2.

The means for mounting the row crop attachment 1 on the base unit 2 comprises a pair of bearing studs 23 mounted at opposite sides of the cutterhead of the base unit 2. One of the studs 23 carries a transverse shaft 24 for a purpose to be described later. The studs 23 are engageable by brackets 25 on arms 26 of the frame 22 of the row crop attachment 1. This arrangement permits limited pivotal movement of the attachment 1 relative to the base unit 2. The lifting of the attachment 1 relative to the base unit 2 is accomplished by a lifting frame 27 pivotally mounted on the base unit 2 and comprising a pair of forwardly-protecting arms 28 having rollers 29 at their forward ends for engaging underside of the frame 22, and an upwardly-projecting arm 30 which is coupled at its upper end to a hydraulic cylinder (not shown) supported on the base unit 2. Actuation of the hydraulic cylinder results in an angular displacement of the lifting frame 27 around its pivot and hence also in an angular displacement of the attachment 1 around the bearing studs 23. The forward end of the header unit 1 may thus be adjusted vertically to dispose the shoes 20 at the desired height above the ground. The skids 21 may be adjusted to contact the ground surface so as to raise the attachment 1 over rises or obstructions in the field when these are encountered. During the latter operation, the header unit 1 may temporarily separate from the lifting frame 27.

The conveyor means generally indicated at 15 are secured to first, second and third rotary means in the form of driven rotary drums 31, 32 and 33 for a left-hand crop row 37 and rotary drums 34, 35 and 36 for a right-hand crop row 38. The rotary drums 31 to 36 have a diameter approximately equal to one third of the crop row spacing and are staggered both transversely and longitudinally relative to the corresponding stalkway 12,13 in such a way that the first and third rotary drums 31,33 and 34,36 of the respective stalkways 12 and 13 are positioned on the outer sides of the stalkways, with rotary drums 32 and 35 located on the respective inner sides. The first, second and third rotary drums 31,32,33 and 34,35,36 are also staggered in a fore-and-aft direction. Furthermore, the third rotary drums 33 and 36 are positioned closer to each other than the forwardmost or first rotary drums 31 and 34. The second rotary drums 32 and 35 are positioned relative to the forwardmost drums 31 and 34 so that, seen in a transverse direction, they overlap each other.

The spacing between the various drums is such that they lie wholly outside the associated stalkway 12,13 but that the conveyor means 15 extend into the latter. The stalkways 12,13 are of serpentine form with the drums located on the concave side of the peaks or troughs thereof so that they follow the peripheries of the drums over a substantial distance, particularly the second and third drums 32,35 and 33,36. The mouths 39,40 of the stalkways 12,13 flare outwardly to maximize the gathering of a row of crop, with the discharge ends 41,42 of the stalkways being much closer together to give rise to the throat 16 having a similar width to the cutterhead, as already mentioned. The throat 16 is defined by the outer walls 44 of the respective stalkways, with the respective inner walls 43 meeting each other mid-way across the throat. The main portions of the stalkways 12,13 are defined by upwardly and outwardly inclined side walls 45 and rearwardly and upwardly inclined bottom walls 46 which extend from forward edges 47 (FIG. 2) to the throat 16. The side walls 45 have upper and lower elongated apertures 45' (FIG. 1) at locations adjacent the various drums 31 to 36 for the through passage of the conveyor means 15.

The conveyor means 15 are in the form of a plurality of outwardly-extending lugs 48 which extend from the respective drums 31 to 36 into the stalkways 12,13 through the apertures 45'. The lugs 48 are formed from sheet metal and have a generally flat forward operative edge 49. The conveyor means 15 of adjacent drums, i.e., the first and second drums 31,32 and 34,35 and the second and third drums 32,33 and 35,36 overlap each other at a location within the stalkways 12,13. This overlapping may be accomplished either by staggering the conveyor means 15 in height or by timing the drives of the various drums so that the lugs 48 of one drum do not interfere with the lugs of the adjacent drum.

The crop cutter means 14 comprise a pair of conventional, cooperating cutter discs 50,51 per stalkway 12,13, the discs being mounted at the bottom ends of the first and second drums 31,34 and 32,35, respectively. The cutter discs 50,51 have cutting edges and cooperate with each other to cut the standing crop by a shearing action. The cutter discs 50,51 also have notches 52 around their peripheries to improve the cutting performance.

Motive power for the various rotary drums 31 to 36 is delivered from the power source on the base unit 2 through any suitable transmissions to a first sprocket 53 on the transverse shaft 24. From here the power is transmitted to the various components through a chain and sprocket transmission comprising a second sprocket 54 which is keyed coaxially with the first sprocket 53 on the transverse shaft 24, a chain 55, and a further sprocket 56 on an intermediate transverse shaft 57 provided on the row crop attachment 1. As drive is transmitted via the transverse shaft 24, which is arranged coaxially with the pivotal mounting of the attachment will not interfere with the power transmission. Motive power is supplied to the third drums 33,36 by two pairs of conical gears 58 arranged between the shaft 57 and the drums 33,36 so as to drive the third drums in the direction 59,60. A further sprocket 61, which extends coaxially with the left-hand drum 33, is arranged to drive the right-hand second drum 35 and the left-hand first drum 31 via a chain 62, sprockets 63,64 mounted coaxially with the second and first drums 35 and 31, respectively, and idlers 65. The arrangement is such that the first and second drums 31 and 35 are driven in the directions 66 and 67. Similarly, a sprocket 68 on the shaft of the drum 36 is arranged to drive the left-hand second drum 32 and the right-hand first drum 34 in the directions 69,70 via a chain 71, the tension of which can be adjusted by means of idlers 72. The chain transmissions described above, and including the chains 62 and 71, are arranged within a shielded area 73 below the level of the bottom walls 46 of the stalkways 12,13 so that they do not interfere with the stalks passing through the stalkways during operation of the forage harvester.

The drums 31 to 36 are shielded from above by the top walls 74 of the respective frames 9, 10 and 11.

OPERATION

In operation in a corn field, the row crop attachment 1 is lowered to a position in which the skids 21 contact the ground and the various components are driven as described as the forage harvester is moved in the operative direction indicated at 75 in FIG. 1 so that the nose portions 17 and 19 are located on either side of the row of corn 38 and the nose portions 18 and 19 are located on either side of the row 37. Due to the forward movement of the harvester, the stalks of corn crop are moved inbetween and relative to the nose portions 17,19; 18,19 in a rearward direction so that they eventually enter the stalkways 12,13 via the respective mouths 39,40. The nose portions 17,18,19 tend to raise any fallen or broken stalks and guide them towards the stalkways 12,13 until they are engaged by the conveyor lugs 48 of the forwardmost drums 31,34. The lugs 48 on the drums 31,34 tend to move the upper portions of the stalks rearwardly in the stalkways while the lower portions of said stalks are engaged and severed from the ground by the cutter discs 50,51. The severed stalks are then conveyed upwardly and rearwardly between the stalkway side walls 45 with the severed ends of the stalks passing over the bottom plates 46. During this rearward transport, the stalks are first moved along the stalkways 12,13 by the lugs 48 of the first drums 31,34 until those lugs retract from the stalkways as a result of the rotation of the drums 31,34 whereupon the lugs of the second drums 32,35 take over the further conveyance of the stalks until their point of retraction when the lugs of the third and final drums 33,36 take over and deliver the stalks to the feed rolls 3. The corn stalks are thus successively transferred from one set of conveyor means 15 to another within the stalkways 12,13 the movement of the stalks being very positive due to the serpentine form of the stalkways which increases the crop engagement path for a given set of lugs 48. The feed rolls 3 pull the stalks, butt ends first, in a rearward direction and feed them to the cutterhead which chops them into small pieces. Thus the crop is cut, positively gathered and fed to the base unit 2 by rotary conveyor means instead of the conventional conveyor chains.

MODIFICATIONS

FIGS. 4 to 9 show another embodiment of the present invention which will now be described, identical components being ascribed identical references numerals to those used in FIGS. 1 to 3.

The row crop attachment according to FIGS. 4 to 9 is basically the same as that of FIGS. 2 and 3 with the exception that different conveyor means are employed and the stalkways 12,13 are not as curvaceous.

Rather than three rotary units per crop row, as in the first embodiment, four rotary units are provided in this embodiment. Pairs of relatively small rotary units 80,81; 82,83 are provided at either side of the stalkway mouths 39,40 and are arranged side-by-side at equal distances in front of the base unit 2. Each rotary unit 80 to 83 carries a cutter disc at its bottom end, the cutter discs being arranged in cooperating pairs 84,85 as before. Each rotary unit 80 to 83 also comprises an upright shaft 86 supporting conveyor fingers 87 which extend through elongated apertures 88 in the stalkway side walls 45, the outer ends of the fingers lagging or trailing with respect to their base ends when seen in the direction of rotation of the rotary units. The fingers 87 of the pairs of cooperating rotary units 80,81 and 82,83 overlap each other within the stalkway mouths 39, 40 and the units 80 and 82 having three sets of fingers spaced axially of the shafts 86, whereas the units 81 and 83 have only two sets.

Further rotary units 89 and 90 are provided rearwardly of the pairs of forwardmost rotary units 80 to 83 within the outer frames 9 and 10. The rotary units 89 and 90 have a much larger diameter than the rotary units 80 to 83 and comprise outwardly extending conveyor fingers 91 arranged in two layers and having outer ends trailing relative to the inner ends when seen in the direction of rotation. Each layer of fingers 91 is secured to a disc 92 which in turn is mounted on a shaft 93. The fingers 91 extend through elongated apertures 94 (FIG. 6) in the outer side walls 44, across the associated stalkway 12,13 and through elongated apertures 95 (FIG. 6) in the inner side walls 43 of the frames 9 and 10 and the frame 11, respectively. Thus, at certain locations the fingers 91 bridge the stalkways 12 and 13. The rotary units 89 and 90 primarily serve the purpose of transferring crop from the cutting zone to the discharge zone in the gathering attachment.

Discharge rotary units 96 and 97 are rotatably mounted on the guide frame 11 in the discharge zone thereof, these units being relatively small in diameter compared with the units 80 to 83, 89 and 90 and comprise conveyor fingers 98 mounted on rotary shafts 99 in a trailing fashion, when seen in the direction of rotation, as described in relation to the fingers 87 and 91. The fingers 98 of the discharge units 96 and 97 are arranged in a single layer so that the overall height of these units is much smaller than that of the other units. The fingers 98 project through elongated apertures 100 into the stalkways 12,13, the apertures being provided in the inner side walls 43 of the stalkways.

It will be noted that neighbouring rotary units overlap each other. More especially, the crop conveyor fingers of the following pairs of units overlap each other within the respective stalkways 12,13; 80,81; 82,83; 81,89; 82,90; 89,96; and 90,97. Furthermore, the discharge rotary units 96 and 97 also overlap each other at a location within the central guide frame 11. Therefore, to avoid collision between the various conveyor fingers, it has been necessary to stagger them in height relative to each other.

It will also be noted that the stalkways 12,13 are still of serpentine form although not as curvaceous as those of the first described embodiment.

Figure 8:
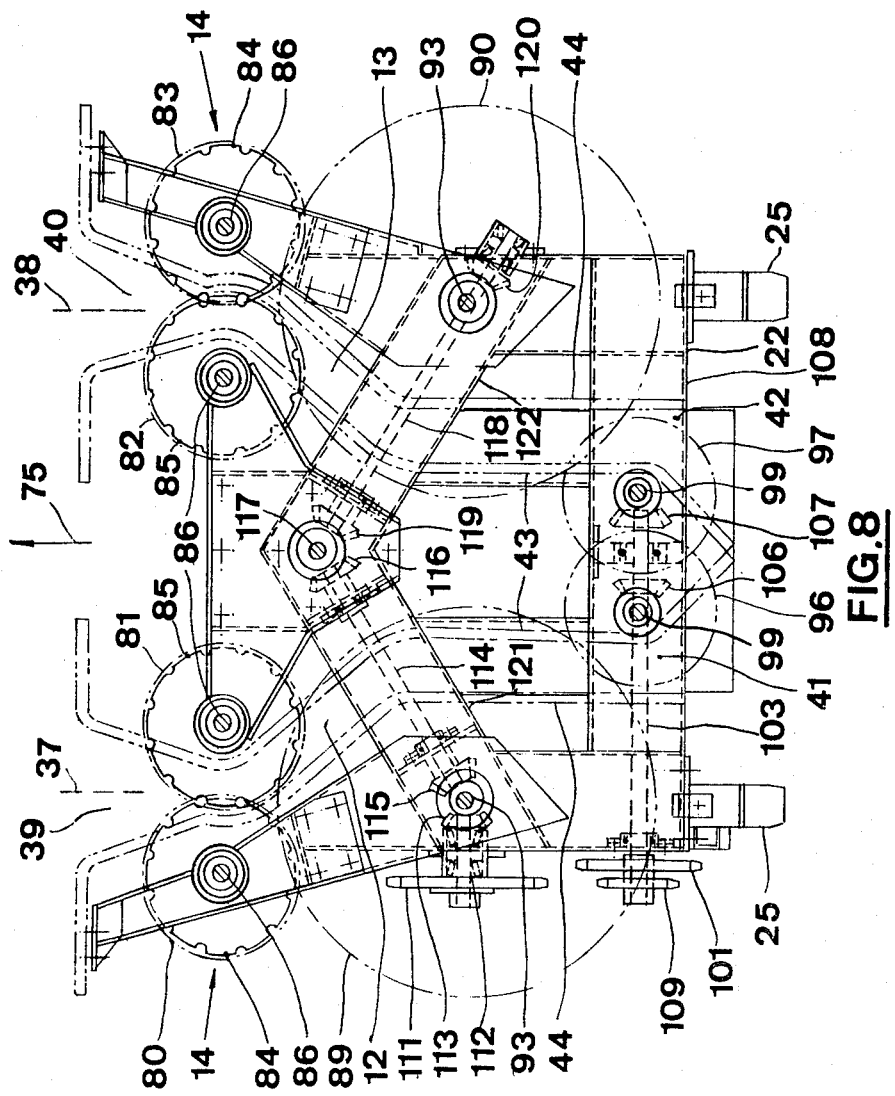
FIG. 8 is a section on line VIII—VIII of FIG. 5.
Figure 9:
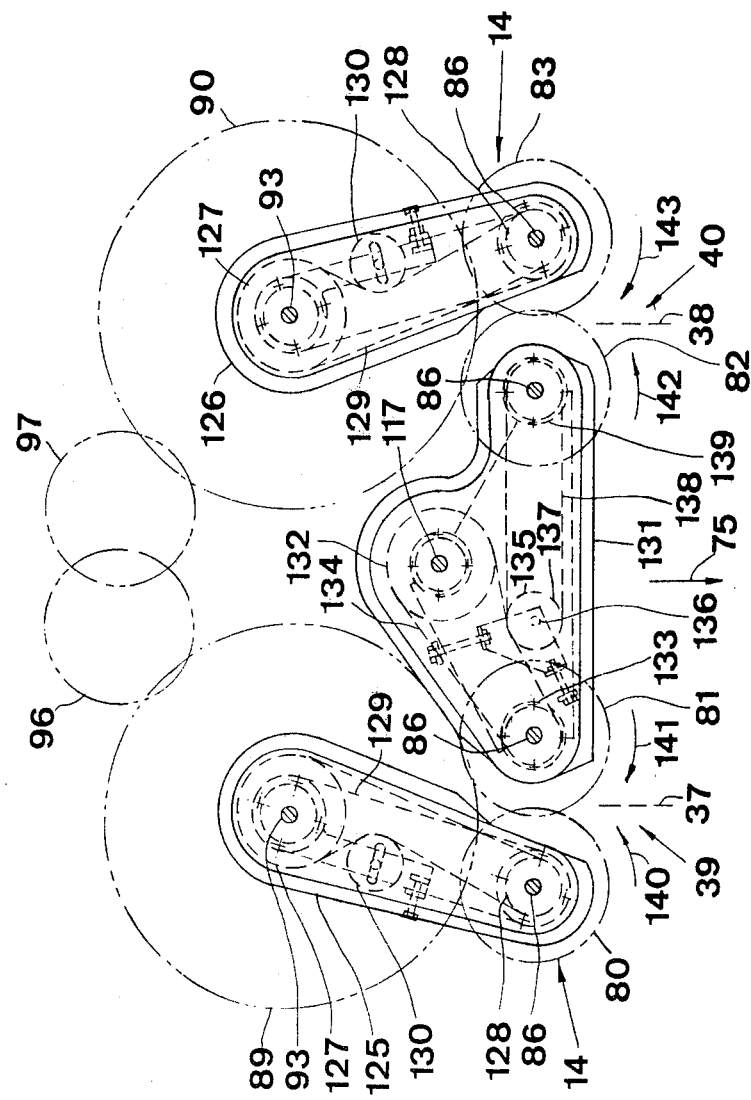
FIG. 9 is a section on line IX—IX of FIG. 5.

The motive power is delivered from the shaft 24 via sprockets 54,101 and a chain 102 to an intermediate transverse shaft 103 which, in turn, drives the discharge rotary units 96 and 97 in the respective directions 104 and 105 via a pair of conical gears 106 and 107 (FIG. 8). The gears 106,107 and the intermediate shaft 103 are provided in a framework 108 at a level below the stalkways 12,13. The left-hand transfer rotary unit 89 is driven from the intermediate shaft 103 via a further sprocket 109 on that shaft, a chain 110, a sprocket 111 on a shaft 112, and a conical gear 113 on the shaft 112 (FIG. 8). A further intermediate shaft 114 with conical gears 115,116 transmits power from the left-hand transfer rotary unit 89 to a central upright shaft 117 supported in the central guide frame 11. A shaft 118 transmits drive to the right-hand transfer rotor 90 from the central upright shaft 117 via conical gears 119 and 120. The foregoing transmissions are housed in frameworks 121 and 122. The transfer rotary units 89 and 90 are driven in the directions 123 and 124. respectively. The drive for the outer crop receiving rotary units 80 and 83 is taken from the shafts 93 via sprocket and chain transmissions housed in the boxes 125 and 126 on top of the row crop attachment 1, the transmissions comprising sprockets 127,128, a chain 129 and an idler 130. The drive for the inner crop receiving rotary units 81 and 82 is taken from the intermediate upright shaft 117 via sprocket and chain transmissions housed in a box 131 also mounted on top of the attachment 1. These transmissions comprise a first chain drive with a sprocket 132 on the upright shaft 117, a sprocket 133 on the left-hand rotary unit 81, and a chain 134 therebetween. Chain tension is adjusted by means of an idler 135 on an idler shaft 136. A further sprocket 137 on the idler shaft 136 transfers power to the right-hand rotary unit 82 via a chain 138 and a sprocket 139. It will be noted that while the transmissions housed in the boxes 125,126 and 131 all are positioned above the level of the crop conveyor means, they do not interfere with the operation of the machine, as none of these drives projects into the stalkways 12,13. The crop receiving rotary units 80 to 83 are driven in the directions 140 to 143, respectively.

In operation of the second embodiment, the crop stalks received in the mouths 39,40 of the stalkways 12,13 are severed from the ground by the cutter discs 84 and 85 and are caught by the fingers 87 of the crop receiving rotary units 81 to 84 which cause the stalks to enter the stalkways 12,13 and deliver them to the transver rotary units 89 and 90. The transfer rotary units 89 and 90 transfer the crop over a substantial distance along the passages 12-13 in a rearward and upward direction. During this transfer, the corn stalks slide along the inner side walls 43 of the stalkways 12,13. While moving through the stalkways 12,13 the crop is held in a substantially upright position by the various superposed layers of conveyor fingers 87 and 91 on the rotary units 80 to 83 and 89,90. It will be appreciated that the forwardmost and central rotary units 80 to 83 and 89,90 have a positive grasp on the crop stalks to convey them rearwardly in the desired orientation.

The discharge rotary units 96 and 97 continue to convey the stalks rearwardly and discharge them through the throat 16 to the feed rolls 3. However, due to the reduced height of the rotary units 96 and 97, these units allow the stalk top ends to fall in a forward direction so that the butt ends of the stalks are better presented to the feed rolls 3. This falling in a forward direction of the stalks at the point where they are presented to the base unit 2 is aided by the provision of a conventional push bar (not shown) at a predetermined height above, and forwardly of, the base unit intake.

The trailing nature of the conveyor fingers 87,91 and 98 result in the various rotary units gently taking over the movement of the stalks from the preceding units at their receiving points and in fluently releasing the same at their discharge points while positively holding and conveying the stalks between these points. It will be appreciated from what precedes that the various rotary units have their own specific functions, receiving the stalks (units 80 to 83), transferring the stalks rearwardly and upwardly (units 89,90) or discharging the stalks (units 96,97).

It will be seen that all of the rotary units are shielded, with the exception of the slots or apertures through which the conveyor fingers extend, whereby crop does not get entangled with rotary units and associated components. It will also be appreciated that, contrary to the arrangement shown in FIGS. 2 and 3, the structure shown in FIGS. 4 to 9 has the intermediate rotary units 89 and 90 positioned at the outer sides of the stalkways 12,13 and the discharge rotary units 96 and 97 positioned within the central guide frame 11. It is found that this arrangement results in a better spreading of the crop material at the discharge end of the attachment over the full intake width of the base unit 2.

Figure 10:
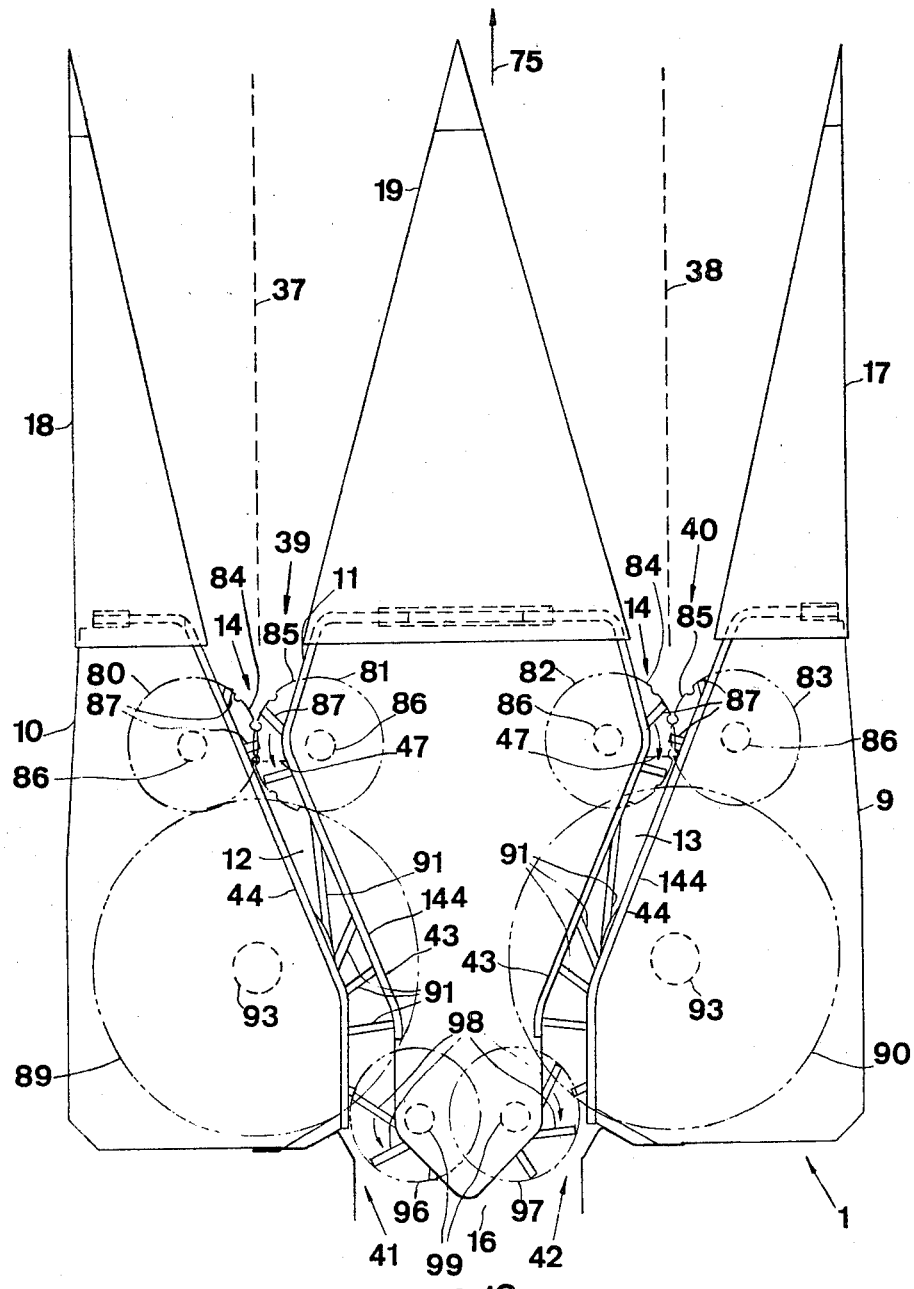
FIG. 10 is a view similar to FIG. 2 but showing a further embodiment.

FIG. 10 illustrates another embodiment of the present invention which is very similar to the embodiment of FIGS. 4 to 9 but wherein the stalkways 12,13 are linear over major portions with slight bends being provided at the intake and discharge ends. The linear portions are inclined at an angle of 20° to 25° to the longitudinal axis of the attachment 1.

The three embodiments of the present invention described so far, are twin row attachments. However, it will be obvious to those skilled in the art that the invention is equally applicable to single row attachments and three or more row attachments. A three row attachment embodying the present invention will now be described in greater detail with reference to the FIGS. 11 and 12. Again, like components are indicated by like reference numerals.

Figure 11:
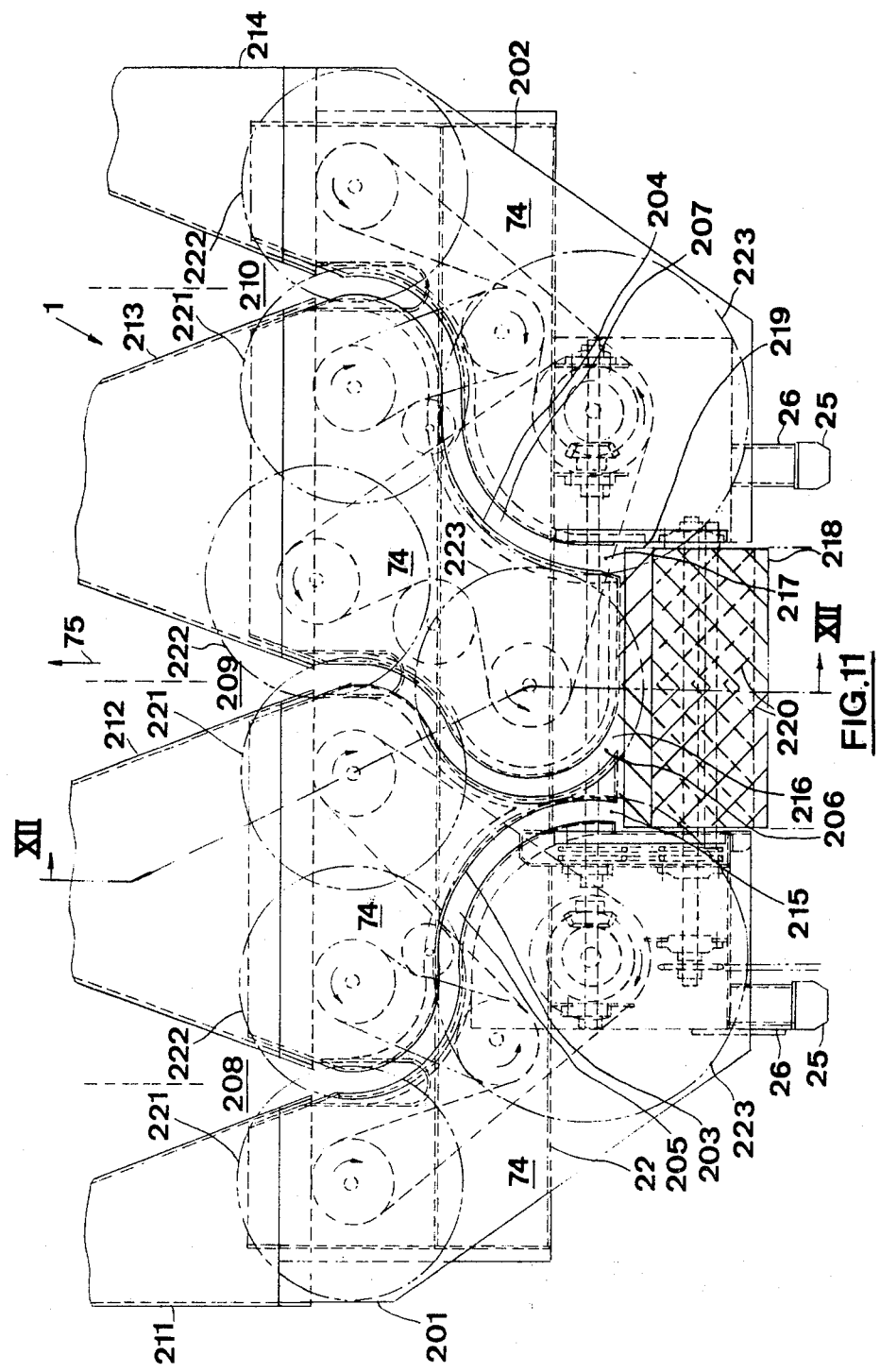
FIG. 11 is a view similar to FIG. 2 but showing a three-row attachment.
Figure 12:
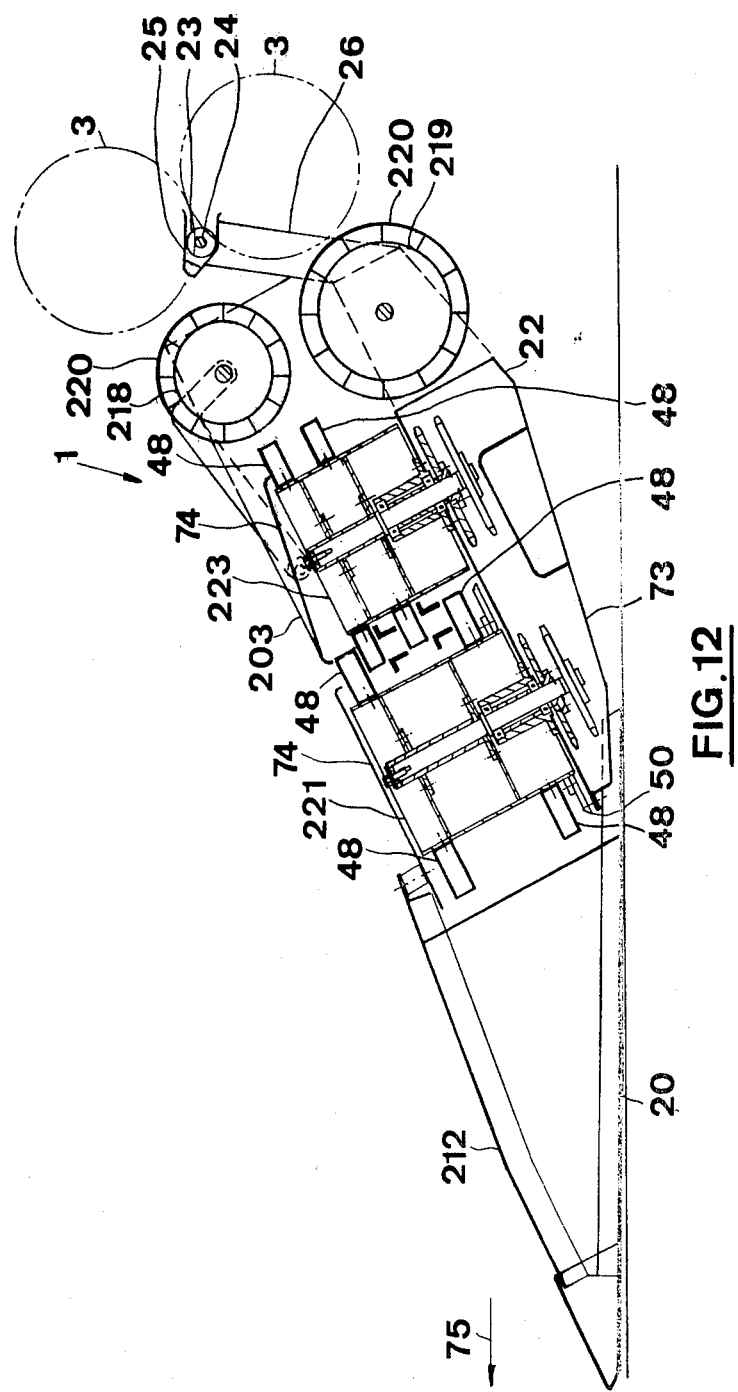
FIG. 12 is a section on line XII—XII of FIG. 11.

The row crop attachment according to FIGS. 11 and 12 comprises outer gathering frames 201 and 202 and a pair of inner guide frames 203 and 204, these frames defining between them three stalkways 205,206 and 207 of serpentine form. The stalkways 205,206 and 207 are spaced apart in accordance with the row crop spacing and have respective mouths 208,209 and 210 with which are associated nose partions 211,212,213 and 214. The discharge ends 215,216 and 217 of the stalkways 205,206 and 207 are much closer to each other than in the previous embodiments and all three face a pair of equilizing rolls 218 and 219. The purpose of the rolls 218 and 219 is to spread the mass of crop material fed to them substantially evenly over the full width of the inlet of the base unit 2 to assist in the transfer of the crop material to the base unit. The two outer stalkways 205 and 207 have their respective discharge ends 215 and 217 at the outer ends of the equalizer rolls 218 and 210. As a result thereof, it is required to spread the crop or otherwise it will tend to block the ends of the throat 16. Spiral ribs 220 are provided on the rolls to assist crop spreading.

As in the embodiment of the FIGS. 2 and 3, the present embodiment comprises three crop conveying rotary units per crop row or stalkway. In each stalkway 205,206 and 207 there is provided a pair of rotary units 221 and 222 having cooperating cutter discs at their base ends. Rearwardly of the units 221 and 222 a single transfer and discharge rotary unit 223 is provided for conveying cut crop stalks rearwardly and upwardly and towards the center of the attachment. The transfer and discharge rotary units 223 of the outer stalkways 205 and 207 are substantially larger in diameter than the forwardmost units 221 and 222 and the central transfer unit 223, and hence extend into a much larger portion of the respective stalkways than the central one. This is necessary as the stalks in the outer stalkways 205 and 207 have to be transported over a larger distance to reach the base unit 2 than those in the central stalkway 206. The central transfer rotary unit 223 is substantially of the same diameter as the rotary units 221 and 222.

The rotary units 221, 222 and 223 of the present embodiment are substantially of the same design, overlap in the same manner and operate substantially in the same way as the rotary units 31 to 36 illustrated in FIGS. 2 and 3.

Any suitable drive means may be provided for driving the various rotary units 221, 222 and 223. A chain drive transmission is shown in the drawings but will not be described in any detail. The direction of rotations of the various rotary units is indicated in FIG. 11.

In operation, the rows of crop are cut and conveyed along the respective stalkways 205, 206 and 207 in very much the same way as described in relation to the embodiment of FIGS. 2 and 3. The stalks are delivered, butt ends first, to the equilizing rolls 218 and 219 which, as already explained, spread them evenly over the intake to the base unit 2 for chopping.

Additional rotary means fitted with conveyor means may be provided at or towards the forward ends of the gathering frames so as positively to engage, and convey rearwardly to the stalkways, any crop which has fallen or which is misaligned with the row being handled and which otherwise might be flattened by the gathering frames and lost.

From the foregoing it will be understood that the invention provides a low profile row crop attachement for a forage harvester, or other harvesting machine, from which the expensive and fast-wearing conventional conveyor chains have been eliminated and replaced by rotary units provided with conveyor fingers or the like. This results in a less expensive structure from the standpoints of manufacture, operation and maintenance. Reduced maintenance is important in terms of decreased downtime during the harvesting season. Furthermore, the drive means are simple and the total number of moving parts is reduced in a number of the illustrated embodiments.

The advantage of a low profile row crop attachment is augmented by a generally compact arrangement, especially in terms of length which is reduced to a minimum by the staggering of the rotary means. Also, the center of gravity of the attachment combined with the base unit is well located relative to the machine wheel base. Thus a more stable and manageable machine is provided. Furthermore, the total weight of the attachment is reduced so that the mounting and detachment thereof relative to the base unit is facilitated. A relative lightweight attachment also reduces the difficulty in supporting and adjusting the attachment relative to the base unit.

A row crop attachment according to the present invention ensures positive severing of the stalks from the ground and a positive feeding of the stalks to the base unit so that crop feeding problems are reduced to a minimum, whereby a high capacity results. Crop losses due either to stalks being missed by the gathering frames or due to stalks escaping the grasp of the conveyor means are reduced to a minimum, even when the crop has been blown down in the field. When additional forward-mounted conveyor means are employed, the crop attachment is also less sensitive to inaccurate row spacing of the crop and/or an inaccurate alignment of the machine with respect to the rows so that a high operational speed can be maintained without unduly tiring the operator. The positive feeding of the crop through the stalkways and the shielding of the gathering frames reduces the risks of crop entanglement in the various moving parts which otherwise can result in jamming.

Having thus described the invention what is claimed is:

1. A row crop attachment for a harvesting machine comprising:
    first and second guide members each having a first guide surface, the first guide surfaces of said first and second guide members being spaced apart and defining therebetween an elongated stalkway terminating at a rear discharge opening;
    a plurality of conveyor elements rotatably affixed to said guide members, each conveyor element including a plurality of outwardly extending crop engaging members, said conveyor elements being positioned along the length of said stalkway such that said crop engaging members cyclically extend into said stalkway and crop stalks entering said stalkway are moved along the length of said stalkway toward said discharge opening in response to being alternately engaged by each of the conveyor elements;
    drive means to positively rotate said conveyor elements in timed relation;
    said conveyor elements being alternately staggered on said first and second guide members along the length of said stalkway;
    said stalkway being of a serpentine configuration including concave portions; and
    said conveyor elements are affixed to said first and second guide members adjacent said concave portions.

2. A row crop attachment according to claim 1 wherein first, second and third conveyor elements are associated with said stalkway, the first and second of which being positioned on said first guide member and rotatable in a first direction by said drive means, and the third conveyor element being positioned on said second guide member intermediate said first and second conveyor elements and driven in a second direction opposite to said first direction by said drive means.

3. A row crop attachment according to claim 1 where first, second, third and fourth conveyor elements are associated with said stalkway, said first and second conveyor elements being positioned at either side of said stalkway approximate said inlet end for causing crop to enter said stalkway, said third conveyor element being positioned approximate said outlet end of said stalkway for discharging crops therefrom through said discharge opening, and said fourth conveyor element being positioned intermediate the first and second conveyor elements and the third conveyor element and alongside the stalkway for transferring crop rearwardly along said stalkway from a location adjacent the first and second conveyor elements to a location adjacent the third conveyor element.

4. A row crop attachment according to claim 2 wherein, the crop engaging members of one conveyor element overlap with the crop engaging members of the adjacent conveyor element and the drive means is synchronized to prevent adjacent conveyor elements from physically interfering with one another.

5. A row crop attachment according to claim 4 wherein, said first conveyor element is positioned proximate to said inlet end of said stalkway, said second conveyor element is positioned proximate to the discharge end of the stalkway and is smaller in diameter than said first conveyor element.

6. A row crop attachment according to claim 5 wherein, said first guide surfaces of said first and second guide members are continuous save for apertures provided therein for the through passage of said crop engaging members.

7. A row crop attachment according to claim 6 further including a floor which is inclined rearwardly and upwardly of the attachment and which bridges the stalkway between said first and second guide members below the level of said conveyor elements.

8. A row crop attachment according to claim 3 wherein, the diameter of said fourth conveyor element exceeds substantially the diameter of said first, second and third conveyor elements.

9. A row crop attachment according to claim 8 wherein, the crop engaging members of one conveyor element overlap with the crop engaging members of the adjacent conveyor element and the drive means is synchronized to prevent adjacent conveyor elements from physically interfering with one another.

10. A row crop attachment according to claim 9 wherein, said first guide surfaces of said first and second guide members are continuous save for apertures provided therein for the through passage of said crop engaging members.

11. A row crop attachment according to claim 10 further including a floor which is inclined rearwardly and upwardly of the attachment and which bridges the stalkway between said first and second guide members below the level of said conveyor elements.

12. A row crop attachment according to either claim 7 or claim 11 wherein, each said conveyor element comprises a drum from the periphery of which extend said crop engaging members.

13. A row crop attachment according to claim 12 further including:
cutter means affixed to said first and second guide members approximate to the forward inlet end of said stalkway for severing crop stalks from the ground, said cutter means operably connected to said drive means.

14. A row crop attachment according to claim 13 wherein, said cutter means are in the form of a pair of cooperating cutter discs overlapping each other substantially approximate to the inlet end of the stalkway, the cutter discs extending co-axially with and below the first and second conveyor elements.

15. A row crop attachment for a harvesting machine comprising:
a generally fore-and-aft extending frame having a forward inlet end and an opposing outlet end with a discharge opening therein, said frame including first and second guide members each having a first guide surface, the first guide surfaces of said first and second guide members spaced apart and defining an elongated stalkway therebetween terminating rearwardly adjacent said discharge opening;
a plurality of conveyor elements rotatably affixed to said guide members adjacent said stalkway, said conveyor elements being alternately staggered on said first and second guide members along the length of said stalkway, each conveyor element including a plurality of crop engaging members thereon, the conveyor elements positioned relative to said stalkway such that crop stalks entering said stalkway are contacted by the crop engaging members of one conveyor element, moved along the opposing guide surface thereby, passed to the next succeeding guide element, moved along the opposing guide surface, and so on until discharged through said discharge opening;
drive means for positively rotating said elements in timed relation;
said stalkway is of a serpentine configuration including concave portions; and
said conveyor elements are affixed to said first and second guide members adjacent said stalkway on the concave portions.

16. A row crop attachment according to claim 15 further including a floor which is inclined rearwardly and upwardly of the attachment and which bridges the stalkway between said first and second guide members below the level of said conveyor elements.

17. A row crop attachment according to claim 16 further including:
cutter means affixed to said first and second guide members approximate to the forward inlet end of said stalkway for severing crop stalks from the ground, said cutter means operable connected to said drive means.

18. A row crop attachment for a harvesting machine comprising:
a pair of spaced apart members defining an elongated stalkway therebetween, the stalkway having a forward inlet and a rearward discharge end and being generally of a serpentine shape with peaks alternating with troughs;
a floor means inclined rearwardly and upwardly and having a forward edge, the floor means bridging the underside of the stalkway;
a pair of gathering frames extending in a divergent manner forwardly of the spaced apart members and forming a stalkway entrance leading to the stalkway inlet end, the gathering frames operable to receive crop stalks therebetween and lead the stalks toward the inlet end of the stalkway;
cutter means at the inlet end of the stalkway and forwardly of the forward edge of the floor means for severing from the ground crop stalks received at the inlet end of the stalkway; and
a plurality of conveyor means rotatably mounted on the spaced apart members alongside the stalkway and at the concave sides of the serpentine shape thereof and extending from outside into the stalkway between the inlet and the discharge ends thereof, the conveyor means at one side of the stalkway rotatable in a first direction and the rotary means at the opposite side of the stalkway rotatable in a direction opposite said first direction and being operable to pass severed crop stalks along the stalkway in a rearward direction toward the discharge end.

19. In a crop attachment for a harvesting machine having a fore-and-aft extending frame with an inlet end and outlet end with a discharge opening therein, the frame including first and second guide members each having a first guide surface, the first guide surfaces of the first and second guide members being spaced apart and defining therebetween an elongated stalkway terminating rearwardly at the discharge opening, conveyor means on the guide members to progressively move crop stalks along the stalkway, and drive means to positively operate the conveyor means, the improvement wherein:

said conveyor means includes a plurality of conveyor elements rotatably affixed to said guide members, each conveyor element including a plurality of outwardly extending crop engaging members, said conveyor elements being positioned along the length of said stalkway such that said crop engaging members cyclically extend into said stalkway and crop stalks entering said stalkway are moved along the length of said stalkway towards said discharge in response to being alternately engaged by each of the guide elements;

said drive means positively rotates said conveyor elements in timed relation;

said conveyor elements are alternately staggered on said first and second guide members along the length of said stalkway;

said stalkway is of a serpentine configuration including concave portions; and said conveyor elements are affixed to said first and second guide members adjacent said stalkway on the concave portions.

20. A row crop attachment according to claim 19, wherein the crop engaging members of one conveyor element overlap with the crop engaging members of the adjacent conveyor element and the drive means in synchronized to prevent adjacent conveyor elements from physically interfering with one another.

21. A row crop attachment according to claim 20, wherein said first guide surfaces of said first and second guide members are continuous save for apertures provided therein for the through passage of said crop engaging members.

22. A row crop attachment according to claim 21 further including a floor which is inclined rearwardly and upwardly of the attachment and which bridges the stalkway between said first and second guide members below the level of said conveyor elements.

23. A row crop attachment according to claim 22 further including:

cutter means affixed to said first and second guide members approximate to the forward inlet end of said stalkway for severing crop stalks from the ground, said cutter means operable connected to said drive means.

24. A row crop attachment according to claim 23 wherein, said cutter means are in the form of a pair of cooperating cutter discs overlapping each other substantially approximate to the inlet end of the stalkway, the cutter discs extending co-axially with and below the first and second conveyor elements.

* * * * *